(12) United States Patent
Akiyama et al.

(10) Patent No.: US 8,606,919 B2
(45) Date of Patent: Dec. 10, 2013

(54) RESOURCE MANAGEMENT TOOL

(75) Inventors: Kazuhito Akiyama, Kanagawa (JP); Kazuo Iwano, Tokyo (JP); Seiji Kobayashi, Tokyo (JP); Yasuhiro Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/626,853

(22) Filed: Nov. 27, 2009

(65) Prior Publication Data

US 2010/0169489 A1    Jul. 1, 2010

(30) Foreign Application Priority Data

Dec. 25, 2008 (JP) ................................ 2008-331324

(51) Int. Cl.
*G06F 15/173* (2006.01)

(52) U.S. Cl.
USPC ........................... 709/226; 709/224; 709/225

(58) Field of Classification Search
USPC ......................................... 709/224, 225, 226
See application file for complete search history.

(56) References Cited

U.S. PATENT DOCUMENTS

| | | | |
|---|---|---|---|
| 7,065,586 B2* | 6/2006 | Ruttenberg et al. | 709/244 |
| 7,290,009 B1* | 10/2007 | Semret et al. | 1/1 |
| 7,613,589 B2* | 11/2009 | Hosagrahara | 702/182 |
| 7,792,724 B2* | 9/2010 | Semret et al. | 705/35 |
| 2003/0083926 A1* | 5/2003 | Semret et al. | 705/10 |
| 2005/0234758 A1* | 10/2005 | Nishi | 705/8 |
| 2005/0283481 A1* | 12/2005 | Rosenbach et al. | 707/10 |
| 2006/0026052 A1* | 2/2006 | Klett et al. | 705/8 |
| 2006/0184626 A1* | 8/2006 | Agapi et al. | 709/205 |
| 2007/0162907 A1* | 7/2007 | Herlocker et al. | 718/100 |
| 2007/0168244 A1* | 7/2007 | Dan et al. | 705/8 |
| 2007/0220152 A1* | 9/2007 | Jackson | 709/226 |
| 2007/0297328 A1* | 12/2007 | Semret et al. | 370/230 |
| 2008/0052397 A1* | 2/2008 | Venkataraman et al. | 709/226 |
| 2008/0313005 A1* | 12/2008 | Nessland et al. | 705/9 |
| 2009/0037242 A1* | 2/2009 | Ventura et al. | 705/7 |
| 2009/0043888 A1* | 2/2009 | Jackson | 709/225 |

(Continued)

FOREIGN PATENT DOCUMENTS

| | | |
|---|---|---|
| JP | 2002041463 A | 2/2002 |
| JP | 2002-333968 A1 | 11/2002 |

(Continued)

*Primary Examiner* — Firmin Backer
*Assistant Examiner* — Jonathan Bui
(74) *Attorney, Agent, or Firm* — Nelson and Nelson; Daniel P. Nelson; Alexis V. Nelson

(57) ABSTRACT

A device, computer program product, and method for managing resources for performing operations in a computer system are presented. The device may include a resource reservation unit to reserve resources for performing an operation specified by a user. A query unit may query the user whether to reserve additional resources in the event the operation cannot be completed within a reserved time in the reserved resources. A resumption instruction unit may cause the resource reservation unit to reserve the additional resources and cause a continuation of the operation in the additional resources upon receiving a resumption instruction in response to the query.

17 Claims, 16 Drawing Sheets

(56) References Cited

U.S. PATENT DOCUMENTS

| | | | |
|---|---|---|---|
| 2009/0254383 A1* | 10/2009 | Semret et al. | 705/5 |
| 2009/0276771 A1* | 11/2009 | Nickolov et al. | 717/177 |
| 2009/0327495 A1* | 12/2009 | Betts-LaCroix et al. | 709/226 |
| 2009/0327962 A1* | 12/2009 | Betts-LaCroix et al. | 715/833 |
| 2010/0023949 A1* | 1/2010 | Jackson | 718/104 |
| 2010/0064292 A1* | 3/2010 | Akutsu et al. | 718/104 |
| 2010/0131959 A1* | 5/2010 | Spiers et al. | 718/105 |
| 2010/0191349 A1* | 7/2010 | Munaga | 700/33 |
| 2011/0046987 A1* | 2/2011 | Petrisor | 705/5 |

FOREIGN PATENT DOCUMENTS

| | | |
|---|---|---|
| JP | 2005-056201 A1 | 3/2005 |
| JP | 2007-066256 A1 | 3/2007 |
| JP | 2007-234740 A1 | 9/2007 |
| JP | 2007299328 A | 11/2007 |
| JP | 2008158844 A | 7/2008 |
| JP | 2008171325 A | 7/2008 |

* cited by examiner

FIG. 4

| OFFERING ID | DATE | STATUS | DETAILS OF OFFERING |
|---|---|---|---|
| 1000_2 | 2008/09/01 10:00:00 | WAIT FOR USER RESPONSE | DATE 2008/09/10 09:00:00-2008/09/15 12:00:00 RESOURCE USED : xxxxxxx PRICE 200$ |
| 1001_1 | 2008/09/28 12:00:00 | WAIT FOR USER RESPONSE | PRICE 100$ |

| RESOURCE ID | TARGET FOR CHARGE | UNIT OF CHARGE (UNIT) | UNIT OF CHARGE (TIME) | UNIT AMOUNT OF CHARGE | CONDITIONS |
|---|---|---|---|---|---|
| 1 | CPU | 0.1 | 1Hour | 0.005$ | |
| 1 | MEMORY | 256MB | 1Hour | 0.005$ | |
| 1 | Disk | 10GB | 1Hour | 0.05$ | |
| 3 | Disk | 100GB | 1Hour | 0.3$ | |

| OPERATION ID | OPERATION NAME | DESIGNATED SLO | START TRANSACTION |
|---|---|---|---|
| 1000 | NETWORK LOG ANALYSIS | ...... | Tran1 |
| 1001 | CHARACTER LENGTH ANALYSIS | ...... | Tran100 |
| | | ...... | Tran101 |
| | | ...... | Tran102 |

610

| OPERATION ID | TRANSACTION | DATA PROCESSING AMOUNT | NEXT TRANSACTION |
|---|---|---|---|
| 1000 | Tran1 | 3GB | Tran2 |
| 1000 | Tran2 | 1KB - 5GB | Tran3 |
| | | | Tran4 |
| 1000 | Tran3 | 1KB - 2GB | Tran5 |
| 1000 | Tran4 | 1KB - 1GB | Tran5 |
| 1000 | Tran5 | 1KB - 100KB | N/A |

| USER NAME | SAVE UNCOMPLETED OPERATION | USE RESULT OF PAST SIMILAR OPERATION | ...... |
|---|---|---|---|
| User1 | YES | NO | |
| User2 | NO | YES | |
| User3 | YES | YES | |

700

| POLICY | VALUE | TARGET RESOURCE ID | CONDITION |
|---|---|---|---|
| SAVE UNCOMPLETED PROCESSING AND PERFORM OFFERING | YES | ALL | |
| CACHE OPERATION RESULT | NO | 3 | |
| PERFORM NOT-AGREED OPERATION ACCORDING TO MAXIMUM POSSIBLE AMOUNT OF PAYMENT OF USER | YES | 1,2 | UP TO 80% OF MAXIMUM AMOUNT |

| RESOURCE ID | RESOURCE NAME | RESOURCE TYPE | NUMBER OF CPUS | MEMORY | Disk | SLA |
|---|---|---|---|---|---|---|
| 1 | Server1 | Server | 4 | 8GB | 800GB | ...... |
| 2 | Server2 | Server | 8 | 16GB | 1600GB | ...... |
| 3 | SAN Disk1 | Disk | N/A | N/A | 30TB | ...... |

| RESOURCE ID | USER NAME | NUMBER OF CPUS USED | MEMORY USED | Disk USED | DATE AND TIME OF FIRST USE | DATE AND TIME OF LAST USE |
|---|---|---|---|---|---|---|
| 1 | User1 | 2 | 2GB | 800GB | 2008/08/01 10:00:00 | 2008/08/31 10:00:00 |
| 2 | User2 | 2 | 4GB | 1600GB | 2008/08/20 9:00:00 | 2008/09/10 23:00:00 |
| 3 | User3 | N/A | N/A | 1TB | 2008/08/20 9:00:00 | 2008/09/10 23:00:00 |

| OPERATION ID | REVISION | START DATE | END DATE | STATUS | OFFERING ID | OPERATION RESULT |
|---|---|---|---|---|---|---|
| 1000 | 1 | 2008/08/01 10:00:00 | 2008/08/20 10:00:00 | COMPLETED | N/A | /dev/result/1000_1 |
| 1000 | 2 | 2008/08/25 10:00:00 | N/A | UNCOMPLETED | 1000_2 | /dev/backup/1000_2 |
| 1001 | 1 | 2008/09/15 9:00:00 | N/A | UNCOMPLETED AND RESULTS PROCESSED | 1001_1 | /dev/result/1001_1 |

1000

280

RESOURCE MANAGEMENT TOOL

RELATED APPLICATIONS

This application claims priority to Japan Patent Application No. 2008-331324 filed on Dec. 25, 2008 and entitled RESOURCE MANAGEMENT DEVICE, RESOURCE MANAGEMENT PROGRAM PRODUCT, AND RESOURCE MANAGEMENT METHOD.

BACKGROUND

Cloud computing has garnered much attention in recent years. This type of computing provides various kinds of services and computer environments by combining hardware resources (such as CPU, memory, and storage) and software resources (such as applications) in response to user requests received over a network.

Indeed, cloud computing generally involves various hardware resources and software resources combined and provided to a user. Thus, it is relatively difficult for the user to determine an appropriate usage amount of such resources. A typical cloud-computing model charges users for resources as they are used. Some techniques enable a user to reserve extra resources for an additional fee. If such resources are not used, however, resources may be unnecessarily idle. On the other hand, if resources are insufficient, it may not be possible to complete a particular service within a reserved service period. In this case, the service may be suspended and an extra fee charged.

SUMMARY

Embodiments of the invention have been developed to facilitate resource management in a distributed computing system.

In one embodiment of the present invention, a device for managing resources for performing operations in a computer system is provided. The device may include a resource reservation unit to reserve resources for performing an operation specified by a user. A query unit may query the user whether to reserve additional resources in the event the operation cannot be completed within a reserved time in the reserved resources. A resumption instruction unit may cause the resource reservation unit to reserve the additional resources and cause a continuation of the operation in the additional resources upon receiving a resumption instruction in response to the query.

A corresponding computer program product and method are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 4 shows an example of a query table stored in a query DB in certain embodiments;

FIG. 5 shows an example of a charge table stored in a charge DB in certain embodiments;

FIG. 6 shows an example of an operation table and a transaction table stored in an operation DB in certain embodiments;

FIG. 7 shows examples of a user policy table and a system policy table stored in a policy DB in certain embodiments;

FIG. 8 shows an example of a resource table stored in a resource DB in certain embodiments;

FIG. 9 shows an example of a resource usage table stored in a schedule DB in certain embodiments;

FIG. 10 shows an example of an execution result table stored in an execution state DB in certain embodiments;

DETAILED DESCRIPTION OF THE INVENTION

Figure 1:
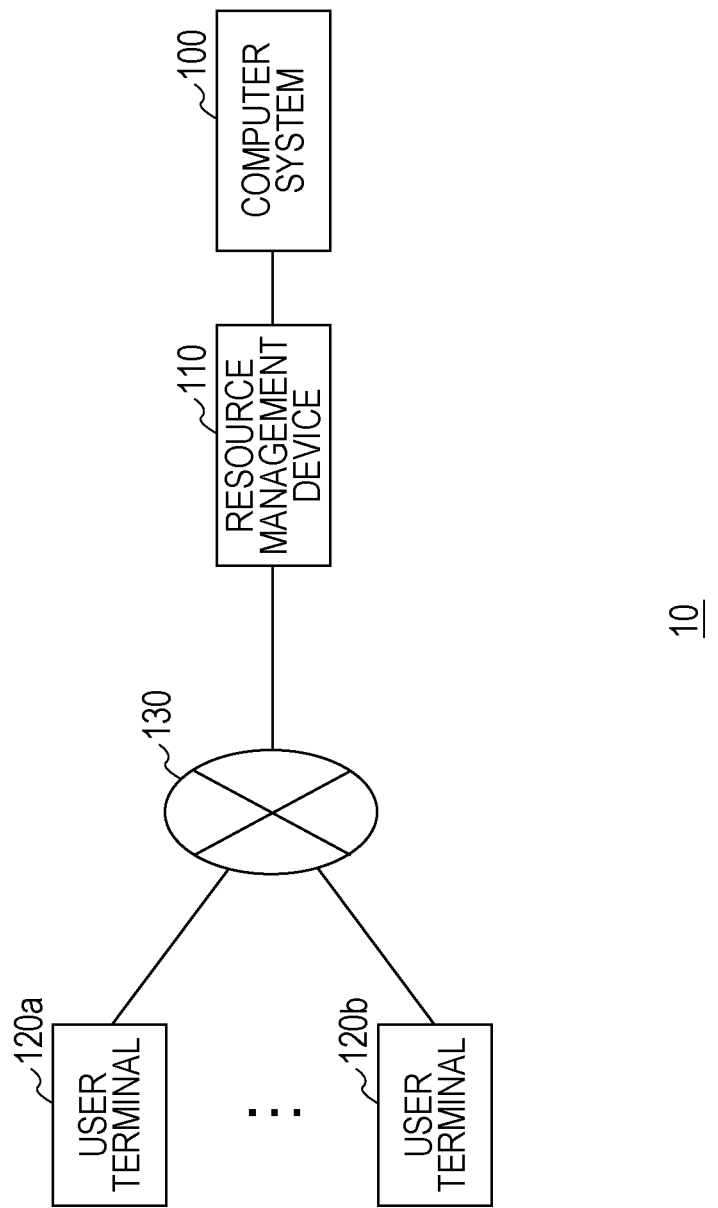
FIG. 1 illustrates a distributed computing system according to an embodiment of the present invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows the configuration of a distributed computing system 10 according to an embodiment of the present invention. Upon receiving a user request to perform an operation, the distributed computing system 10 may reserve hardware resources and/or software resources in a computer system 100 for a predetermined period of time, and may perform an operation specified by a user. If the reserved resources are not sufficient for the operation, the distributed system 10 may query the user to determine whether to reserve additional resources. Upon receiving an instruction to reserve additional resources, the system may reserve additional resources and continue the operation.

In some embodiments, the computer system 100 may include one or more resources used to perform information processing. The computer system 100 may perform information processing specified by a user using at least one of such resources.

A resource management device 110 may manage resources for performing operations in the computer system 100. Upon receiving a user request to provide a service, execute a program, or perform another function specified by the user, the resource management device 110 may reserve at least one resource for performing the specified operation. The device may then perform the operation using the resources. If the reserved resources are insufficient, the resource management device 110 may, in response to an instruction from a user, reserve additional resources in the computer system 100 and continue the specified operation.

User terminals 120a and 120b may be operated by a user to instruct the resource management device 110 to provide a service, execute a program, or the like, and may provide results of the same. A network 130 such as the Internet, the Intranet, a local area network ("LAN"), or the like, may connect the user terminals 120a and 120b with the resource management device 110.

Figure 2:
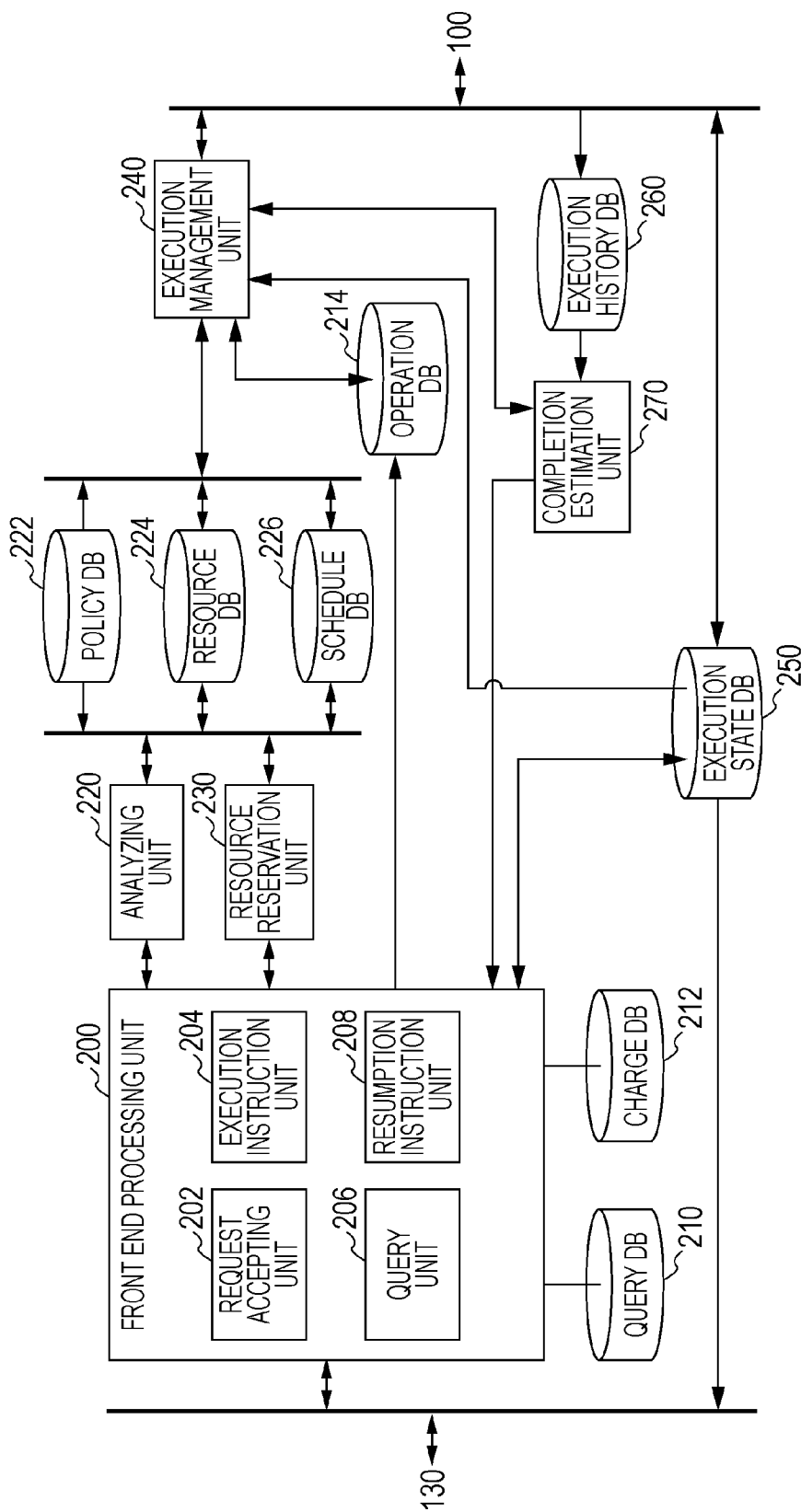
FIG. 2 shows a resource management device in accordance with one embodiment.

As shown in FIG. 2, a resource management device 110 in accordance with certain embodiments may include a front end processing unit 200, a query database ("DB") 210, a charge DB 212, an operation DB 214, an analyzing unit 220, a policy DB 222, a resource DB 224, a schedule DB 226, a resource reservation unit 230, an execution management unit 240, an execution state DB 250, an execution history DB 260, and a completion estimation unit 270. The front end processing unit 200 may provide an instruction to perform or resume an interaction with the user terminal 120 through the network 130, and/or an instruction to perform or resume an operation specified by a user. The front end processing unit 200 may include a request accepting unit 202, an execution instruction unit 204, a query unit 206, and a resumption instruction unit 208.

The request accepting unit 202 may accept detailed information about an operation, such as a program or a service desired by a user from the user terminal 120. Upon receiving detailed information about the operation, the request accepting unit 202 may request that the analyzing unit 220 estimate how long and which resource should be reserved. The request accepting unit 202 may calculate a charge for resources to be reserved. This charge amount may be based on the estimation result and the charge DB 212. The request accepting unit 202 may then provide the calculated charge to a user via the user terminal 120.

The request accepting unit 202 may receive an execution request from the user. In this case, the request accepting unit 202 may notify the execution instruction unit 204 that the execution request has been received. In some embodiments, a user may further instruct the request accepting unit 202 regarding an execution service level to be satisfied by resources for performing a specified operation in accordance with a user's instruction or a contract with the user.

Upon receiving the execution request from the request accepting unit 202, the execution instruction unit 204 may request that the resource reservation unit 230 reserve resources. In addition, the execution instruction unit 204 may store detailed information about a specified operation in the operation DB 214 to thereby instruct the execution management unit 240 to perform the specified operation.

The query unit 206 may query a user to determine whether to reserve additional resources if it is determined that a specified operation is not likely to be completed within the reserved time for the resources. The query unit 206 may store information about the query in the query DB 210. Upon receiving a user instruction to additionally reserve resources, the query unit 206 may notify the resumption instruction unit 208 about the instruction. In certain embodiments, the computer system 100 may charge the user an additional fee for the additional resources reserved. Accordingly, the query unit 206 may further query a user regarding payment of a resumption fee needed to additionally reserve resources and continue the specified operation. If the user responds to this query affirmatively, additional resources may be reserved.

Upon receiving a user resumption instruction to additionally reserve resources, the resumption instruction unit 208 may cause the resource reservation unit 230 to reserve additional resources and continue a specified operation. In embodiments where an additional fee may be charged for additionally reserving resources, the resumption instruction unit 208 may instruct the resource reservation unit 230 to continue a specified operation in response to an affirmative response from the user regarding payment of the resumption fee.

In certain embodiments, the front end processing unit 200 may further include a charging unit for charging a user for execution or re-execution of a specified operation. The charging unit may issue a transaction to charge a usage fee or additional fee on an external server device that manages a user account or credit card.

In some embodiments, the operation DB 214 may store information about each operation specified by a user. The analyzing unit 220 may analyze information about an operation received from the request accepting unit 202 and/or the query unit 206, and may reference the policy DB 222, the resource DB 224, and the schedule DB 226 to determine at least one resource for performing the operation, as well as an amount of time reserved for the resource. The analyzing unit 220 may forward information about the at least one resource and the reserved time to the request accepting unit 202 and/or the query unit 206.

The policy DB 222 may store a user policy that indicates user-specific execution conditions for a specified operation, and a system policy that indicates defaults for the execution conditions for a specified operation. The resource DB 224 may store, in association with each resource in the computer system 100, information about a target resource such as a resource type, attributes of the resource, and a service level required for the resource. The schedule DB 226 may store a schedule for which each specified operation may use each resource in the computer system 100.

Upon receiving a request to reserve resources from the execution instruction unit 204, the resource reservation unit 230 may reserve resources for performing a specified operation, as instructed by the execution instruction unit 204. In addition, upon receiving a request to additionally reserve resources from the resumption instruction unit 208, the resource reservation unit 230 may reserve resources needed to resume a specified operation, as instructed by the resumption instruction unit 208. Particularly, in response to an instruction from the execution instruction unit 204 and/or the resumption instruction unit 208, the resource reservation unit 230 may register a resource use schedule in the schedule DB 226 to reserve at least one specified resource for a specified time.

In certain embodiments, the execution management unit 240 may manage execution of each specified operation in the computer system 100. To be specific, the execution management unit 240 may assign reserved resources to each specified operation, and may cause the computer system 100 to perform a specified operation in the reserved resources for a reserved time. In addition, the execution management unit 240 may instruct the computer system 100 to suspend the specified operation if it cannot be completed within the reserved time.

In certain embodiments, the execution state DB 250 or other execution state storage unit may store an execution state of a suspended operation. If resources are additionally reserved to resume a suspended operation, the execution management unit 240 may cause the computer system 100 to resume the specified operation with the additionally reserved resources for an additionally reserved time. Further, in some embodiments, the execution state DB 250 may store execution results of each specified operation. The execution state DB 250 may send an execution result of a specified operation in response to a request from the user terminal 120.

In some embodiments, the execution history DB 260 or other execution history storage unit may store a history of operation duration of past specified operations. More specifically, the execution history DB 260 may successively receive a monitored execution state and an operation duration of a specified operation, which may be sent from the computer system 100 during execution of the specified operation.

The completion estimation unit 270 may estimate whether a specified operation is likely to be completed within a reserved time of reserved resources during execution of the specified operation. For example, the completion estimation unit 270 may estimate whether a specified operation will be completed within reserved time based on monitoring an execution state of the specified operation stored in the execution history DB 260, and a history of operation duration of past operations similar to the specified operation. Then, the completion estimation unit may notify the front end processing unit 200 and the execution management unit 240 of the estimate. In response, the query unit 206 in the front end processing unit 200 may query the user terminal 120 regarding whether to additionally reserve resources if a specified operation is not completed within the reserved time. In some embodiments, the execution management unit 240 may instruct the computer system 100 to suspend the specified operation.

In some embodiments, if a specified operation is not likely to be completed within a reserved time with reserved resources, the specified operation may be continued after reserving additional resources with the approval of a user. Accordingly, even if a user does not reserve extra resources in advance, the resource management device 110 may reserve additional resources and complete an operation with the approval of the user.

Figure 3:
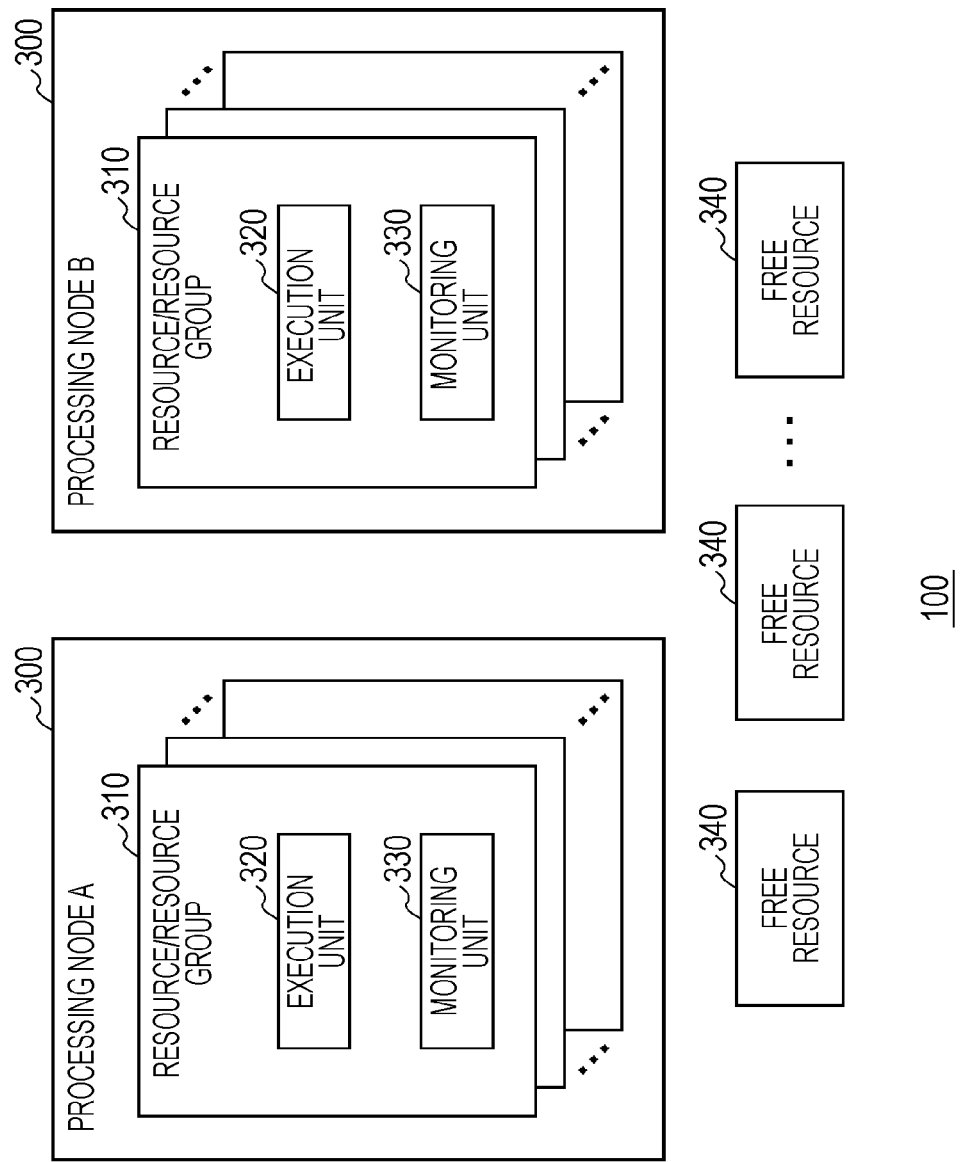
FIG. 3 shows the logic configuration of a computer system in accordance with certain embodiments.

Referring now to FIG. 3, a computer system 100 in accordance with embodiments of the invention may be implemented by, for example, a cloud computing system, a grid computing system, a parallel computer, a supercomputer, a server, a personal computer, a combination thereof, or the like.

A computer system 100 in accordance with embodiments of the invention may include one or more resources used for performing information processing. Conceivable examples of such resources in the computer system 100 may include a physical or logical processor, memory, storage, a communication interface, an information processing unit, a computer cluster, and other such hardware resources used for performing information processing. Another conceivable example of a resource in the computer system 100 may include an application program and an operation system that limit the number of users that access the program or system at one time.

In some embodiments, one or more processing nodes 300 may be virtual computer systems configured by combining one or more resources or groups 310 designed to cooperate to perform a specified operation. The one or more resources or groups 310 provided in each processing node 300 may be reserved to perform a corresponding specified operation by the execution management unit 240.

In certain embodiments, each of the resources or groups 310 may be configured by occupying at least a part of a resource or resource group or groups (for example, CPU+ memory+hard disk). Each resource or group 310 may include an execution unit 320 for performing part or all of a specified operation. The resource or group 310 may further include a monitoring unit 330 for monitoring an execution state of the execution unit 320 and sending the monitoring result to the execution history DB 260 in the resource management device 110. In addition, the computer system 100 may include one or more available or "free" resources 340 that have not been reserved for any specified operation, and are thus idle.

FIG. 4 shows an example of a query table 400 that may be stored in the query DB 210 in certain embodiments. The query unit 206 may query a user through the network 130 and the user terminal 120 to determine whether to additionally reserve resources to continue a specified operation if the specified operation cannot be completed within the reserved time. As discussed in more detail below, the query unit 206 may store information about the query directed to the user ("details of offering") in the query table 400 of the query DB 210.

In certain embodiments, for example, the query table 400 may store, for each query, "offering ID" to identify each query added to other queries by the query unit 206, "date" of a query directed to a user, "status" indicating status of a query, and "details of offering" indicating information about a query. For example, a query having an offering ID of "1000_2" (illustrated on the first line in FIG. 4) may be an offer to continue an operation within a certain time period ("date 2008/09/10 09:00:00-2008/9/15 12:00") using certain resources ("xxxxxxx") for an extra charge of $200.00.

As shown, a query having an offering ID of "1001_1" (illustrated on the second line in FIG. 4) may be an offer to continue an operation for an extra charge of $200.00. In either case, "wait for user response" may be provided as the status, indicating that although the query unit 206 has sent a query to the user terminal 120, the user terminal 120 has not yet replied.

FIG. 5 shows an example of a charge table 500 that may be stored in the charge DB 212. The charge table 500 may store a unit charge for each resource or portion of a resource. For example, in some embodiments, the charge table 500 may store a "resource ID" to identify a resource, "target for charge" to indicate a target resource portion for charge, "unit of charge (unit)" indicating a unit amount used as a reference for determining a unit price of charge for the target resource portion for charge, "unit of charge (time)" indicating a unit amount used as a reference for determining a unit time for the target resource portion for charge, and "unit amount of charge" indicating the total fee charged for using the target resource portion for an amount specified by "unit of charge (unit)" in a period specified by "unit of charge (time)," and "conditions" indicating conditions to which the unit amount of charge is applied.

In the illustrated embodiment, a resource having a resource ID of "1" is a computer including a CPU, a memory, and a disk as targets for charge. For the CPU, "unit of charge (unit)" is 0.1, "unit of charge (time)" is 1 hour, and "unit amount of charge" is $0.005, so a fee of $0.005 is charged if the CPU is charged for 10% of a period set per CPU in one hour. For the memory, "unit of charge (unit)" is 256 MB, "unit of charge (time)" is 1 hour, and "unit amount of charge" is $0.005, so a fee of $0.005 is charged if the memory of 256 MB is reserved for one hour. For the disk, "unit of charge (unit)" is 10 GB, "unit of charge (time)" is 1 hour, and "unit amount of charge" is $0.05. Thus, a fee of $0.05 is charged if a storage area of 10 GB is reserved for one hour.

In certain embodiments, the request accepting unit 202 and/or the query unit 206 may offer a fee for reserving at least one resource (or part thereof) for a predetermined time that is substantially proportionate to the usage amount and time, based on the unit amount of charge for the resource (or part thereof). In other embodiments, the request accepting unit 202 and/or the query unit 206 may implement a charging scheme that gradually increases or decreases a charged fee in accordance with the usage amount and/or time of resource (or part thereof). In still other embodiments, the request accepting unit 202 and/or the query unit 206 may implement a charging scheme that charges a user a fixed price when the usage amount, the usage time, and/or the product reaches or exceeds a certain value.

In some embodiments, a condition field may be used to establish conditions under which the unit amount of charge is applied, i.e., a guaranteed service level (guaranteed reliability, guaranteed usage ratio, necessity of encoding, encoding level, and the like), season/date/time zone, and/or conditions of free resources in the computer system 100 (e.g., free resources must account for X % or less of all resources). As a result, in certain embodiments, the request accepting unit 202 and/or the query unit 206 may vary a charged fee based on a guaranteed service level, a time for which resources are reserved, and/or a load on the computer system 100.

Further, in certain embodiments, the charge table 500 may store different unit amounts of charge in accordance with various service level settings. For example, where a condition specifies that "if another specified operation is given a higher priority than a target specified operation and performed first, the specified operation is performed with a delay," a lower unit amount of charge than usual may be set in the charge table 500. Similarly, where a condition specifies that "if another specified operation is given a higher priority than a target specified operation and resources are provided for the other specified operation, the target specified operation may be continued by reserving resources having a low service level," a lower unit amount of charge than usual may be set in the table 500. Where a condition states that "if a specified operation is not completed within a reserved time for the resources, the specified operation is continued in free resources," a lower unit amount of charge may be set in the charge table 500.

Further where a condition provides that "if it is estimated that a specified operation could not be completed within reserved time of resources, a query about whether to add resources is sent," a higher unit amount of charge may be set in the charge table 500. Where a condition provides that "if it is estimated that a specified operation could not be completed within reserved time of resources, resources are automatically added to complete the operation," a much higher unit amount of charge may be set in the table. In some embodiments, a charging scheme may be implemented that charges no fee until a specified operation is completed, and then charges only an extra fee. In other embodiments, a charging scheme may be implemented that does not charge a fee at all.

FIG. 6 shows an example of an operation table 600 and a transaction table 610 stored in the operation DB 214 in accordance with an embodiment of the invention. The operation table 600 may store, in association with at least one specified operation to be performed in the computer system 100, an "operation ID" identifying each specified operation, an "operation name" indicating a name of each specified operation, a "designated SLO (service level offering)" listing various conditions of service level that may be set based on the agreement with a user with respect to execution of a specified operation, and at least one "transaction" to be started to perform the specified operation.

The designated SLO field may be used to store various conditions of service level that may be based on the agreement with a user with respect to execution of a specified operation. Examples of the conditions of service level may include a guaranteed value of reliability ("MTBF"), a guaranteed value of usage ratio, necessity of encoding, an encoding level, and/or information about whether to share hardware resources with another specified operation. The start transaction field may be used to specify a transaction to be called to start a specified operation. The transaction unit processing may be assigned to at least one specified operation. Examples may include one or more processes, one or more threads, one or more databases, or the like.

A transaction table 610 may store, in association with each transaction included in each operation to be performed in the computer system 100, an "operation ID" identifying a specified operation including the transaction, a "transaction" identifying the transaction, a "data processing amount" as an amount processed during the transaction, and a "next transaction" identifying a subsequent transaction. In the case of performing or resuming a specified operation, the execution instruction unit 204 and the query unit 206 may register each transaction included in each specified operation in the transaction table 610. In certain embodiments, the execution management unit 240 may obtain information about a transaction dynamically generated during execution of a specified operation from the computer system 100, and may dynamically store the information in the operation DB 214.

FIG. 7 shows examples of a user policy table 700 and a system policy table 710 that may be stored in the policy DB 222 in accordance with certain embodiments. The user policy table 700 may store a "user name" identifying a user, as well as user policy application enable/disable information indicating whether to apply user policy items to a user, such as "save uncompleted operation" and "use result of past similar operation." The resource management device 110 may set user policies for each user in response to instructions from an administrator of the resource management device 110 and the computer system 100, or instructions sent from each user in advance. In certain embodiments, the resource management device 110 may allow a user to change user policies in the policy DB 222 via the user terminal 120 and network 130.

In some embodiments, the system policy table 710 may store a "policy" on the system side, such as "save uncompleted operation and perform offering," "cache operation result," and "perform not-agreed operation according to maximum possible amount of payment of user." The system policy table 710 may further store a "value" used as system policy application enable/disable information indicating whether to apply a corresponding policy, a "target resource ID" indicating a resource to which the system policy is applied, and a "condition" to which the system policy is applied. For example, as shown, the system policy "save uncompleted operation and perform offering" has a target resource ID of "ALL" and a value of "Yes," and may thus be applied to all resources.

Further as illustrated, the system policy "cache result of performing operation" has a target resource ID of "3" and a value of "No," and thus may not be applied to Resource 3. In certain embodiments where a system policy specifies that a particular resource is exempt from application (as above), it may be implied that the policy should be applied to resources other than those specifically exempt. Further as illustrated, the system policy "perform not-agreed operation according to maximum possible amount of payment of user" is applied to Resources 1 and 2. This policy thus indicates that, after being suspended due to shortage of resources, a specified operation for which a user does not agree to pay an additional fee may be continued only up to 80% of the maximum possible amount of payment.

FIG. 8 shows an example of a resource table 800 that may be stored in the resource DB 224 in accordance with certain embodiments. The resource table 800 may store, in association with each resource in the computer system 100, resource attributes such as "resource ID," "resource name," "resource type" indicating a type of target resource, "number of CPUs," "memory," "disk," and "SLA" indicating a service level that can be provided by the resource. In the illustrated embodiment, a resource may be configured using at least one external storage device such as a CPU, memory, and a disk, or combination thereof.

For example, as illustrated, Resource 1 (resource name: "Server 1") is a server device including four CPUs, an 8 GB memory, and an 800 GB hard disk. A service level that can be provided by Server 1 (such as guaranteed values of reliability/usage ratio, an encoding function, and/or a selectable encoding level) may be stored in the SLA field. In addition, as illustrated, Resource 3 (resource name: "SAN Disk 1") may be a large-capacity storage device connected to a server area network ("SAN") equipped with neither a CPU nor a memory.

In certain embodiments, the aforementioned resource table 800 may be set by an administrator of the resource management device 110 based on the configuration of the computer system 100. Instead of setting the table as above, the resource management device 110 may create the resource table 800 by searching for resources contained in the computer system 100.

FIG. 9 shows an example of a resource usage table 900 stored in the schedule DB 226 in accordance with certain embodiments. The resource usage table 900 may store, in association with each resource in the computer system 100, a "resource ID," a "user name," a "number of CPUs used" indicating the number of CPUs used by the user, "memory used" indicating a memory amount used by the user, "disk used" indicating a storage capacity of an external storage device used by the user, "date and time of first use," and "date and time of last use," collectively indicating to the user a reservation duration for which the resource has been reserved.

For example, in order to reserve a part of Server 1 in Resource 1 as shown in FIG. 8, two CPUs, a 2 GB memory, and an 800 GB disk may be reserved for a period from "2008/08/01 10:00:00" to "2008/08/31 10:00:00" to enable "User 1" to perform at least one specified operation. Further as shown in FIG. 8, for example, a 1 TB storage capacity of a partial area of SAN Disk 1 in Resource 3 may be reserved by User 3 for a period from "2008/08/01 10:00:00" to "2008/08/31 10:00:00."

FIG. 10 shows an example of an execution result table 1000 that may be stored in the execution state DB 250 in accordance with certain embodiments. The execution state DB 250 may store, in association with each of one or more specified operations, an "operation ID," "revision," "start date" and "end date" indicating a duration of an operation, "status," and "offering ID" and "operation result" corresponding thereto.

The revision field may store information specifying the number of times a certain operation may be resumed. In certain embodiments, the execution result table 1000 may show the number of times resources are reserved to perform a specified operation. For example, the revision shown as "1" may correspond to a state in which a specified operation is performed for the first time in response to a user request to perform a specified operation. The revision shown as "2" may correspond to a state in which an operation is not completed within a reserved time of resources and is then suspended once, after which the specified operation is resumed in response to an instruction to resume the operation. In other words, in some embodiments, the revision shown as "n" indicates a state in which a specified operation is suspended (n−1) times due to shortage of resources, and then the operation is performed for the nth time in response to a user instruction to resume the operation (n−1) times.

The start date and end date field may indicate the start date and end date of a specified operation according to the revision. The status field may indicate a state of an operation being performed according to the revision. The status field set as "completed" may indicate that a specified operation has been performed according to the revision and completed. The status field set as "uncompleted" may indicate that a specified operation has been performed according to the revision but is not completed, and an execution state of the specified operation may not be saved. The status field set as "uncompleted and results processed" may indicate that a specified operation has been performed according to the revision but is not completed and suspended, and an execution state of the suspended specified operation may already be saved.

The offering ID field may store information regarding whether to additionally reserve resources, such as a user response to a query from the query unit 206 where a specified operation cannot be completed within a reserved resource time. The operation result field may store a result of performing a specified "completed" operation and may store a progress report on a specified operation or information about where a file describing an execution state of a suspended specified operation is stored. This file may be stored in the execution state DB 250, or elsewhere in the computer system 100.

Figure 11:
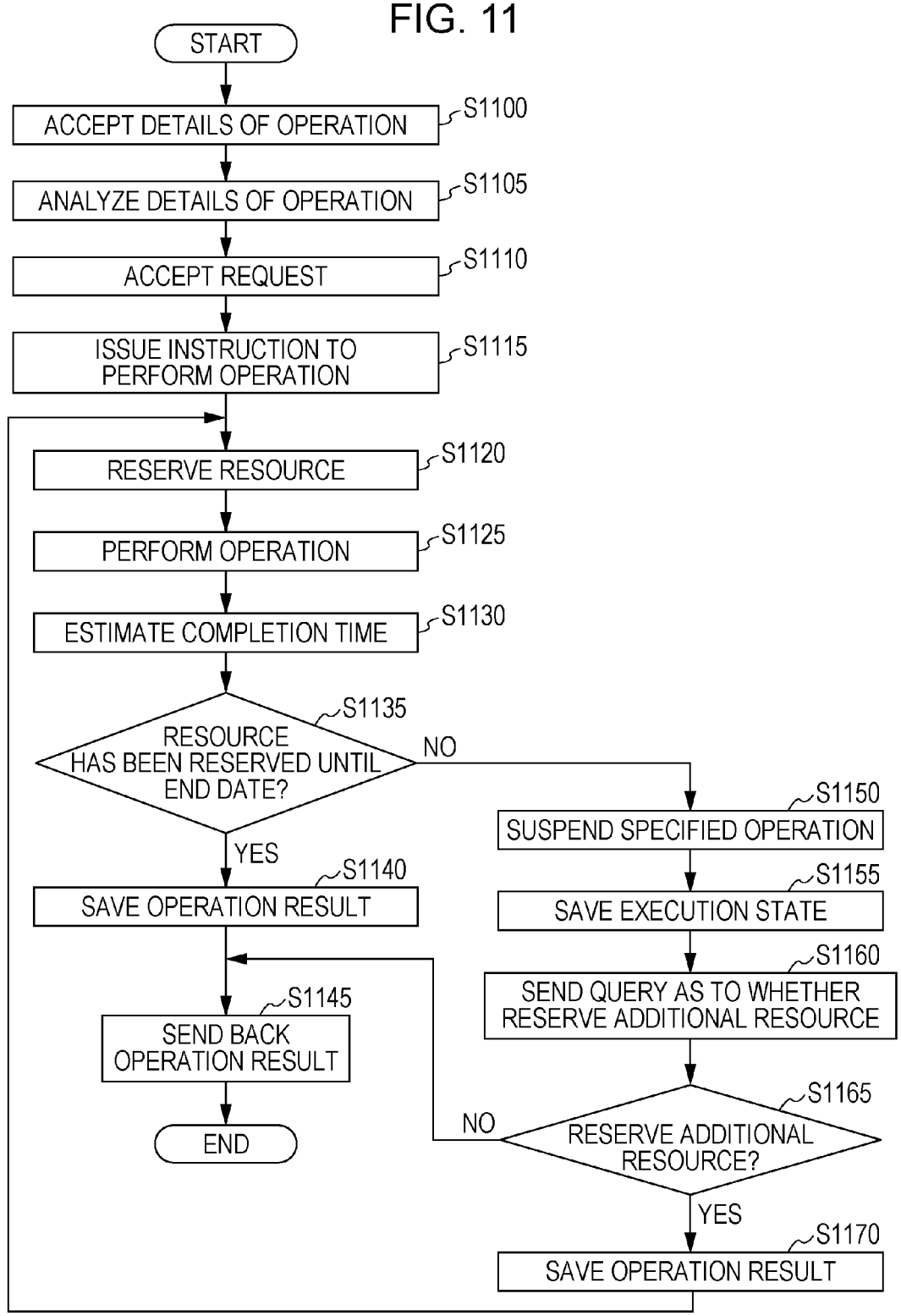
FIG. 11 shows an operational flow of a distributed system in accordance with certain embodiments.

FIG. 11 shows an operational flow of the distributed system 10 in accordance with certain embodiments. In one embodiment, the request accepting unit 202 may accept S1100 detailed information about an operation desired by a user, such as a service or a program, from the user terminal 120. The service may refer to an operation performed in the computer system 100 by a user applying designated data and/or parameters to a program installed in the computer system 100. In some embodiments, the computer system 100 may execute a program received from a user on the computer system 100.

The request accepting unit 202 may accept detailed information about a specified operation and instructions regarding a service or a program. Such information may include data and/or parameters applied to a service or program, a desired service level, and a desired ending time of an operation. In certain embodiments, if a user wants to directly reserve resources, the request accepting unit 202 may receive through the user terminal 120 an instruction regarding a length of time and an identity of a resource to be reserved.

The analyzing unit 220 may receive from the request accepting unit 202 information about an operation accepted from a user. The analyzing unit 220 may analyze S1105 the received information to determine at least one resource to be reserved for performing a specified operation, and reserved time for each resource to satisfy a service level desired by a user until the designated ending time. The request accepting unit 202 may accept from the analyzing unit 220 information about the resources to be reserved for performing the specified operation and the reserved time, and may reference the charge DB 212 to calculate a charge necessary to reserve the resources for the reserved time.

The request accepting unit 202 may notify a user (through the network 130 and the user terminal 120) of the user instructions and of an estimated charge. The request accepting unit 202 may then prompt S1110 the user to enter a reply as to whether to perform the specified operation. If the user makes a request to perform the operation, a contract regarding the user instructions and the charge may be closed. The request accepting unit 202 may then notify the execution instruction unit 204 that the request to perform the operation has been received.

In response, the execution instruction unit 204 may request that the resource reservation unit 230 reserve resources. The execution instruction unit 204 may further register detailed information about a specified operation in the operation DB 214, and provide S1115 an instruction to perform the specified operation. The execution instruction unit 204 may assign an operation ID to a newly accepted specified operation, and may register an SLO designated under a contract with a user. This transaction may start the specified operation in the operation DB 214.

In some embodiments, the execution instruction unit 204 may register an operation ID and revision "1" of a specified operation in the execution result table 1000 of the execution state DB 250. If a user checked a charged fee and entered a reply that he or she does not want to perform a specified operation under the conditions in S1110, the request accepting unit 202 may return processing to S1110.

The resource reservation unit 230 may reference the schedule DB 226 to determine a schedule for use of resources to be reserved, and may register in the schedule DB 226 a plan for reserving the resources for designated hours. In this way, the resource reservation unit 230 may reserve S1120 the resources for reserved hours.

In some embodiments, the execution management unit 240 may reference the schedule DB 226 at the time of updating the schedule DB 226, or at regular intervals. When resources reserved by the resource reservation unit 230 may be used, the execution management unit may instruct the computer system 100 to perform S1125 a specified operation registered in the operation DB 214. For example, the execution management unit 240 may boot a virtual machine in a processing node including each hardware resource to be reserved. This may activate a start transaction for performing a specified operation on the virtual machine. Then, the execution management unit 240 may store the start date and time of the operation, the status "uncompleted," and an operation result stored in a storage area and written to a record corresponding to the specified operation in the execution result table 1000.

When a specified operation is being performed in reserved resources in the computer system 100, the completion estimation unit 270 may estimate S1130 whether the specified operation can be completed within reserved time of the resources. In some embodiments, the completion estimation unit 270 may estimate operation duration necessary to complete the specified operation being performed based on a history of operation duration of identical or similar past-specified operations stored in the execution history DB 260.

If it is estimated that the specified operation being performed is likely to be completed before the ending time stored in the resource usage table 900 in the schedule DB 226 (S1135: Yes), the execution management unit 240 may complete the operation and save S1140 an operation result in the execution state DB 250. The resource management device 110 may receive an operation result of the specified operation from the computer system 100, and may store the result in a storage area written to an operation result field in a record corresponding to the specified operation in the execution result table 1000. Then, the resource management device 110 may indicate "completed" in the status of the record.

After the operation result of the specified operation has been saved in the execution state DB 250, the resource management device 110 may send back S1145 the operation result of the specified operation to the user terminal 120 through the network 130. This may terminate the operational flow illustrated in FIG. 11. In this case, the resource management device 110 may send a pointer to a storage area registered in the operation result field in the execution result table 1000 to the user terminal 120 to allow the user terminal 120 to reference the storage area.

On the other hand, if it is estimated that a specified operation is not likely to be completed prior to the ending time (S1135: No), the execution management unit 240 may instruct the computer system 100 to suspend S1150 the operation. In response, the computer system 100 may suspend the specified operation, and send an execution state of the suspended specified operation to the resource management device 110. The execution management unit 240 may then instruct the computer system 100 to perform the specified operation in the resources reserved in S1115 for the reserved time, and may cause the computer system 100 to automatically suspend the specified operation at the end of the reserved time.

In certain embodiments, the resource management device 110 may store S1155 an execution state of the suspended specified operation in a storage area registered in the operation result field in a corresponding record in the execution result table 1000. In one embodiment, the resource management device 110 may save an execution image of a virtual machine used to perform a specified operation, and the entire internal status of a virtual device in file form to thus save an execution state of the suspended specified operation. In other embodiments, if plural check points are set in a program for performing a specified operation, the resource management device 110 may save log data for resuming the specified operation at a check point just before the stop. When an execution state of the suspended specified operation is stored in the execution result table 1000, the execution management unit 240 may change the status in a record corresponding to the specified operation to "uncompleted and result processed."

If a specified operation is suspended and its execution state is saved in the execution state DB 250, the query unit 206 may query S1160 a user to determine whether to pay an additional fee to additionally reserve resources. Specifically, in certain embodiments, the query unit 206 may send data about the remaining process of the specified operation to the analyzing unit 220, and may cause the analyzing unit to estimate resources and reserved time necessary for resuming the specified operation. The query unit 206 may receive an estimate result from the analyzing unit 220, and may reference the charge DB 212 to calculate an extra fee. Then, the query unit 206 may assign an offering ID to the query, and may register the detailed query in the query table 400. The query unit 206 may write the offering ID to a corresponding record in the execution result table 1000.

In addition, if a user issues a change instruction to change conditions, such as a service level and/or ending time, the query unit 206 may cause the analyzing unit 220 to estimate necessary resources and reserved time according to the changed conditions. For example, where the query unit 206 receives a user change instruction to change the execution service level upon reserving additional resources to resume a specified operation, the analyzing unit 220 may determine that different resources satisfying the new execution service level, or resumption service level, should be reserved.

In the event the query unit 206 receives an instruction to set the resumption service level lower than the execution service level, the query unit 206 may lower a unit amount of charge for additional resources reserved to resume a specified operation. In some embodiments, the unit amount of charge may be based on a unit amount of charge established for each service level and stored in the charge DB 212. In this case, for example, the unit amount may be reduced from that unit amount charged prior to suspension of the operation. In other embodiments, the query unit 206 may receive an instruction to set the resumption service level higher than the execution service level initially applied to the reserved resources. In this case, the query unit 206 may increase a unit amount of charge for additional resources reserved to resume the specified operation. The unit amount of charge may be based on a unit amount of charge established for each service level and stored in the charge DB 212. In this example, the unit amount may be increased from that charged prior to suspension of the operation.

Upon receiving a user instruction to additionally reserve resources to resume a specified operation, the query unit 206 may notify the resumption instruction unit 208 that the instruction to resume the specified operation has been received (S1165: Yes). Further, the query unit 206 may delete a query corresponding to the instruction from the query table 400, or may set the query as closed. In response, the resumption instruction unit 208 may request that the resource reservation unit 230 additionally reserve resources, as well as recall an execution state of the specified operation stored in the execution state DB 250. The resumption instruction unit 208 may further send S1170 an instruction to resume the operation to the execution management unit 240 through the operation DB 214. The resumption instruction unit 208 may register an operation ID and revision of the resumed operation in the execution result table 1000 of the execution state DB 250.

To resume a specified operation, the resource reservation unit 230 may reserve S1120 resources that satisfy an identified execution service level. If an instruction to change the execution service level to a new resumption service level is received, the resource reservation unit 230 may reserve resources that satisfy the resumption service level. When resources additionally reserved with the resource reservation unit 230 can be used, the execution management unit 240 may recall an execution state of the operation (which may be stored in the execution state DB 250), and may instruct S1125 the computer system 100 to resume the operation. In the event resources other than the resources originally used to perform the specified operation are additionally reserved, the execution management unit 240 may recall an execution state of the operation stored in the execution state DB 250 to facilitate resuming the operation in the other resources.

In certain embodiments, for example, the execution management unit 240 may recall an execution image of a virtual machine and the entire internal status of a virtual device in the additionally reserved resources to prompt the virtual machine to resume the operation. In other embodiments, the execution management unit 240 may apply, in a program for performing a specified operation, log data obtained at a check point just before the suspension, and may prompt the program to resume the specified operation.

Thereafter, the resource management device 110 may execute S1130 subsequent steps for the resumed specified operation. As a result, if a specified operation is not completed in initial resources, the resource management device 110 may resume the specified operation with the approval of a user.

Figure 12:
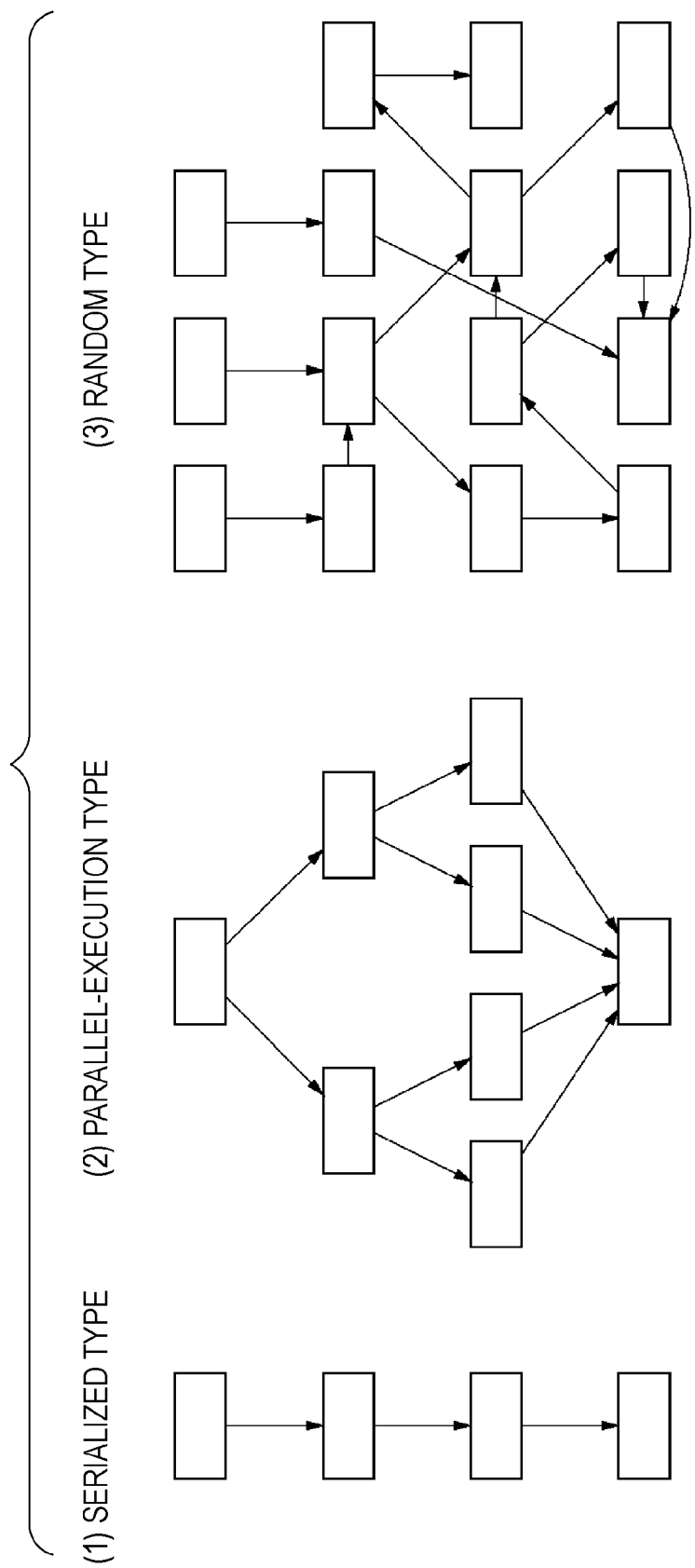
FIG. 12 shows an example of a type of operation performed in a distributed system in accordance with certain embodiments.

FIG. 12 shows an example of one type of operation that may be performed in a distributed system 10 in accordance with certain embodiments of the invention. In some embodiments, the analyzing unit 220 and the completion estimation unit 270 may determine which operation type corresponds to a target specified operation. Then, the analyzing unit 220 and the completion estimation unit 270 may estimate required resources and reserved time, as well as a time necessary to complete the specified operation based on the type of operation thus determined.

The analyzing unit 220 and the completion estimation unit 270 may analyze the service or program from a user, and may select an associated type of operation. Here, if a service program is pre-stored in the computer system 100, an administrator of the computer system 100 and the resource management device 110 may define in advance the type of operation associated with the service.

In a serialized type of operation, such as that illustrated in FIG. 12(1), transactions included in a specified operation may be executed in order. In parallel-execution type operations, such as that illustrated in FIG. 12(2), transactions included in a specified operation may be executed in parallel. In particular, as shown in FIG. 12(2), a start transaction may be divided into two or more transactions, after which divided transactions may be further divided into two or more transactions to enhance parallelism. Finally, the final transaction may compute the operation results.

In a random type of operation, such as that illustrated in FIG. 12(3), since a new transaction is generated according to a result of executing each transaction, for example, the entire flow of transactions may not be sorted to any fixed type at the start of a specified operation. Here, if a specified operation is a Monte Carlo simulation, as is generally known to those in the art, it may be possible to estimate the additional number of transactions necessary for convergence to an error range specified according to a convergence speed.

In some embodiments, the analyzing unit 220 and the completion estimation unit 270 may further determine a processing time for each transaction in proportion to a processing data amount, for example. In certain embodiments, the analyzing unit 220 and the completion estimation unit 270 may retrieve a history of operation time for a particular transaction from the execution history DB 260 to estimate a time necessary for the transaction. In other words, the analyzing unit 220 and the completion estimation unit 270 may multiply an operation time for a previously-performed same transaction by a ratio of the current data amount to the past data amount. In this manner, the analyzing unit 220 and the completion estimation unit 270 may thereby calculate an operation time necessary for the current transaction.

Further, in some embodiments, if results of executing the same transaction with varying data amounts are stored in the execution history DB 260, the analyzing unit 220 and the completion estimation unit 270 may further estimate a relationship between the operation time for a transaction and the data amount (for example, the operation time may be proportionate to the square of the data amount). In other embodiments, the analyzing unit 220 and the completion estimation unit 270 may calculate an average operation time per transaction to calculate an operation time based on the number of transactions to be performed and the number of transactions that may be performed in parallel.

As described above, embodiments of the invention may render it possible to estimate, based on the type of specified operation, the execution history, and the type of two or more transactions included in the specified operation (or the remaining procedure of the specified operation), a time necessary to complete the specified operation, and parallelism of transactions at each time. The analyzing unit 220 may determine, based on the estimate, how long and which resource should be reserved. In addition, the completion estimation unit 270 may estimate the time necessary to complete the specified operation in the reserved resources based on the estimate.

Figure 13:
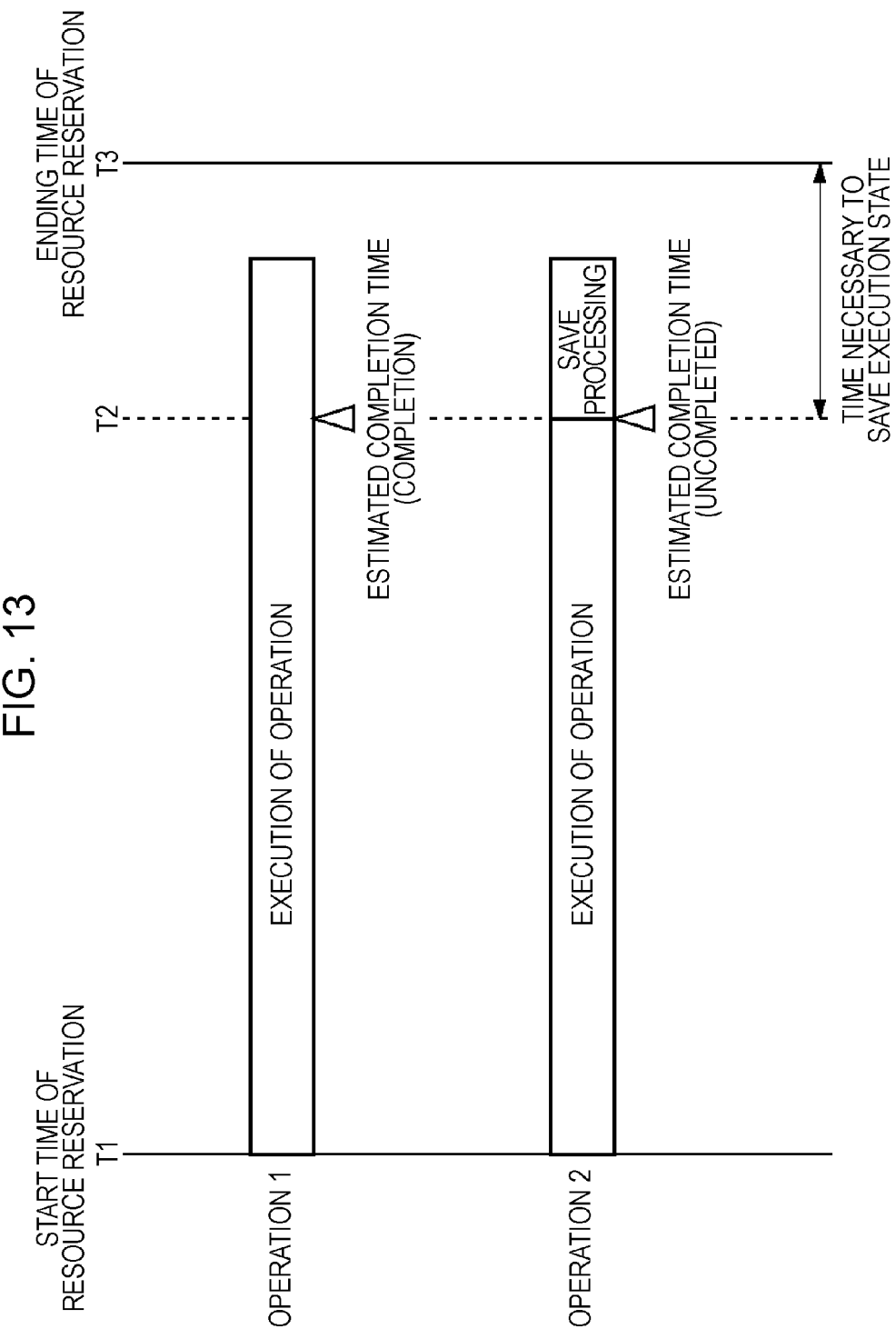
FIG. 13 shows one example of an operation time chart of a resource management device in accordance with embodiments of the invention.

FIG. 13 shows one example of an operation time chart of a distributed system 10 in accordance with embodiments of the invention. In this example, the completion estimation unit 270 estimated whether a specified operation could be completed between the ending time T3 for the reservation of resources and the time T2 before suspension (at which an execution state may be saved). To further increase estimation accuracy, the completion estimation unit 270 may estimate, prior to the completion time T2, whether a specified operation is likely to be completed between the ending time T3 and the time T2 before suspension.

If the completion estimation unit 270 determines that, as a result of estimation, a specified operation is likely to be completed prior to the ending time T3 of reservation of resources, the execution management unit 240 may continue the specified operation even after the time T2 (Operation 1). On the other hand, if the estimate predicts that a specified operation is not likely to be completed within a reserved time of resources, the completion estimation unit 270 may instruct the execution management unit 240 to suspend the specified operation between the ending time T3 and the time T2 before the suspension. In response, the execution management unit 240 may cause the resources in the computer system 100 to save an execution state for the operation.

According to the completion estimation unit 270 of this example, if a specified operation needs to be suspended, an execution state may be saved within a reserved period of resources. Accordingly, the completion estimation unit 270 may prevent a situation where a process for saving an execution state of a previous specified operation consumes time reserved for a subsequent specified operation.

In some embodiments, the completion estimation unit 270 may estimate the suspension time based on an average value of time necessary to save an execution state per transaction, the number of transactions being currently executed, and the parallelism for saving an execution state. In certain embodiments, the completion estimation unit 270 may further estimate the suspension time for a current transaction based on a history of suspension times for identical or similar past transactions, or may use a pre-set time as the suspension time.

Figure 14:
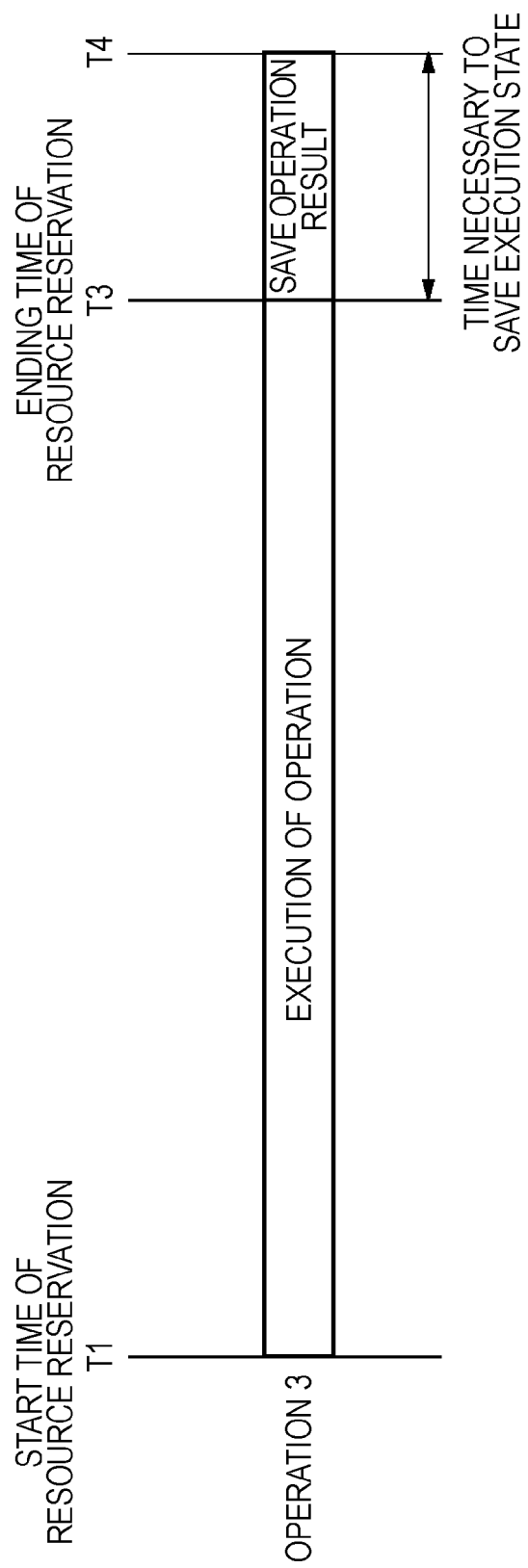
FIG. 14 shows a second example of an operation time chart of the resource management device in accordance with embodiments of the invention.

FIG. 14 shows a second example of an operation time chart of a distributed system 10 in accordance with embodiments of the invention. As shown, the completion estimation unit 270 may cause the computer system 100 to perform a specified operation until the ending time T3 of reservation of resources. If the specified operation is not completed at the ending time T3, the completion estimation unit 270 may instruct the computer system 100 to suspend the specified operation. Then, the execution management unit 240 may cause the resources in the computer system 100 to save an execution state.

In the illustrated example, the resource management device 110 may assign the entire reserved time of resources to a specified operation without estimating the time necessary to save an execution state. In some embodiments, the resource management device 110 may dispense with the completion estimation unit 270 and always perform the operation described above with reference to FIG. 14. In other embodiments, the operation described above with reference to FIG. 13 may be applied to a specified operation having a suspension time that may be estimated, and the operation described above with reference to FIG. 14 may be applied to a specified operation having a suspension time that cannot be estimated. In this case, the resource management device 110 may require authorization from a user to incur an additional fee for the additional time needed to save an execution state, as well as an additional fee for the suspension duration. In some embodiments, if multiple specified operations successively reserve the same resources, the resource reservation unit 230 may provide a margin of time between such reservations.

Figure 15:
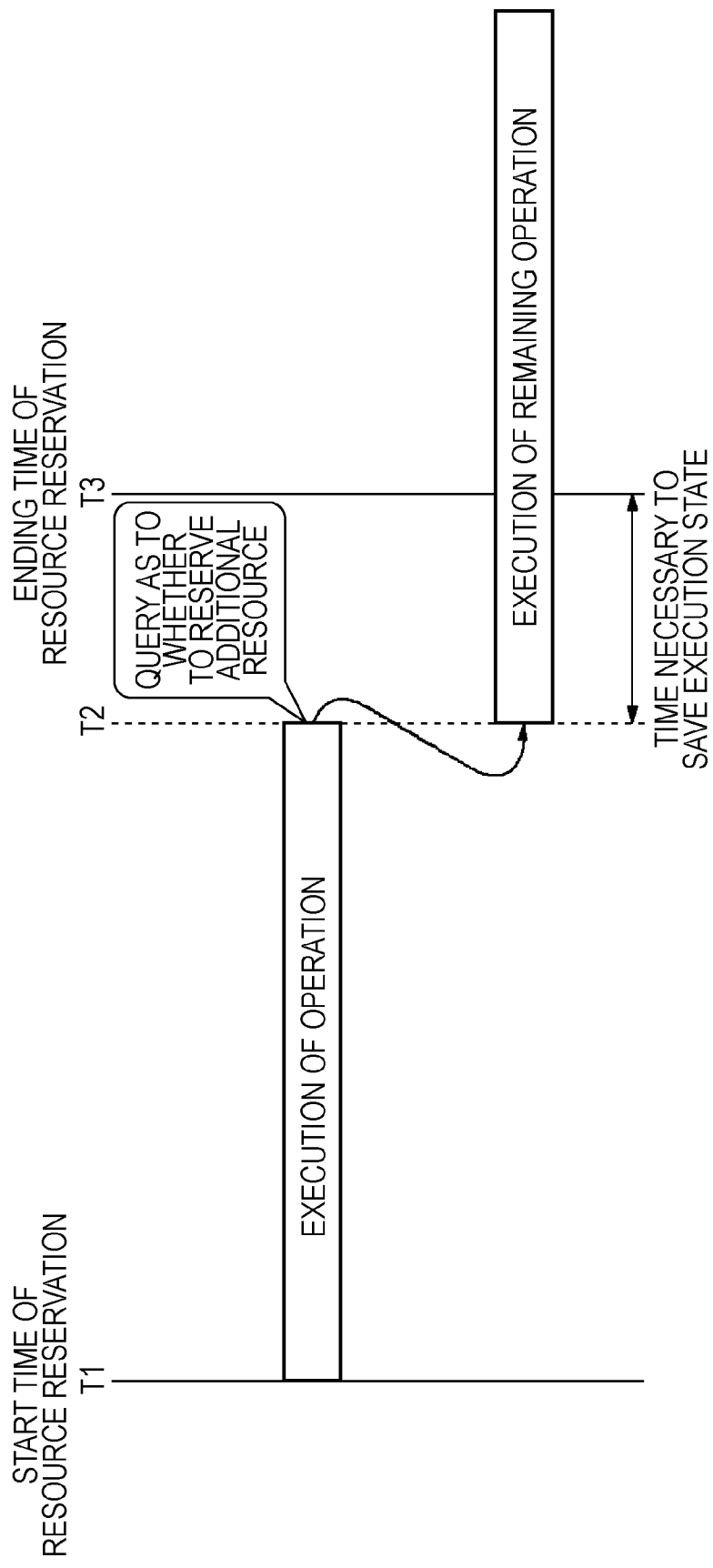
FIG. 15 shows a third example of an operation time chart of the resource management device in accordance with embodiments of the invention.

FIG. 15 shows a third example of an operation time chart of a distributed system 10 in accordance with embodiments of the invention. As shown, before receiving a resumption instruction from a user to additionally reserve resources and resume a specified operation, the resumption instruction unit 208 may cause the resource reservation unit 230 to reserve resources, and may resume the specified operation in the reserved resources. As a result, if a specified operation is not completed until the ending time T3 of the reservation of resources, the resumption instruction unit 208 and the execution management unit 240 may cause the computer system 100 to resume the specified operation in anticipation of receiving a user resumption instruction to additionally reserve resources.

For example, if it is determined that a specified operation may not be completed until the ending time T3 of reservation of resources, the completion estimation unit 270 may so notify the front end processing unit 200. In response, the query unit 206 may query a user through the network 130 and the user terminal 120 to determine whether to additionally reserve resources. In other embodiments, the resumption instruction unit 208 may cause the resource reservation unit 230 to reserve the same or different resources without waiting for a reply from a user, and may then instruct the execution management unit 240 to resume the specified operation in the reserved resources. In this case, the resumption instruction unit 208 may speculatively resume a specified operation if a free resource is found. If no free resource is found, the unit may wait for a reply from the user.

Where a specified operation is resumed prior to receiving a resumption instruction from a user, the resumption instruction unit 208 may reduce a resumption fee relative to the fee that would be applicable after receiving a resumption instruction from the user. In this case, the query unit 206 may offer the reduced resumption fee to the user and may query the user to determine whether to additionally reserve resources to resume a specified operation. As a result, the resumption instruction unit 208 may speculatively resume a specified operation utilizing free resources, while allowing a user to utilize the additional resources at a reduced fee.

In other embodiments, where a specified operation is resumed before receiving a resumption instruction from a user, the resumption instruction unit 208 may increase a resumption fee relative to the fee that would be applicable after receiving a resumption instruction from the user. In this case, the resumption instruction unit 208 may charge an increased resumption fee in exchange for advantageously enabling the specified operation to be completed in less time than would be possible if receipt of the resumption instruction was required first.

In the event that a specified operation is speculatively resumed as described above, the resumption instruction unit 208 may reserve resources not satisfying guaranteed reliability and/or usage ratio of resources conditions provided in the contract. In this case, if resources are in operation until when a resumption instruction is received from a user, the execution management unit 240 may shift an execution state of the currently performed operation to resources satisfying the service levels in the contract. On the other hand, if any failure occurs in the resources, the execution management unit 240 may suspend speculatively performing a specified operation and may resume the specified operation in the resources satisfying the service levels in the contract.

If policies regarding speculative execution of a specified operation are set in the user policy table 700 and/or the system policy table 710, the resumption instruction unit 208 may determine whether to speculatively perform the specified operation based on the policies. In certain embodiments, the resumption instruction unit 208 may further select a specified operation from multiple suspended specified operations to resume the operation based on the priority assigned to a user who specified each specified operation, an amount of resumption fee necessary to resume each specified operation, and/or an estimated time necessary to complete each specified operation. In one embodiment, for example, the resumption instruction unit 208 may put an operation specified by an important user (like a client of the distributed system 10) above the other operations, and may speculatively perform the operation.

In some embodiments, the resumption instruction unit 208 may place a specified operation above the other operations and may speculatively perform the operation based on, for example, a larger or smaller resumption fee or a resumption fee within a user-designated range. In other embodiments, the resumption instruction unit 208 may give preference to a specified operation that is estimated to be completed in a longer or shorter time than the other operations, and may speculatively perform the operation.

Figure 16:
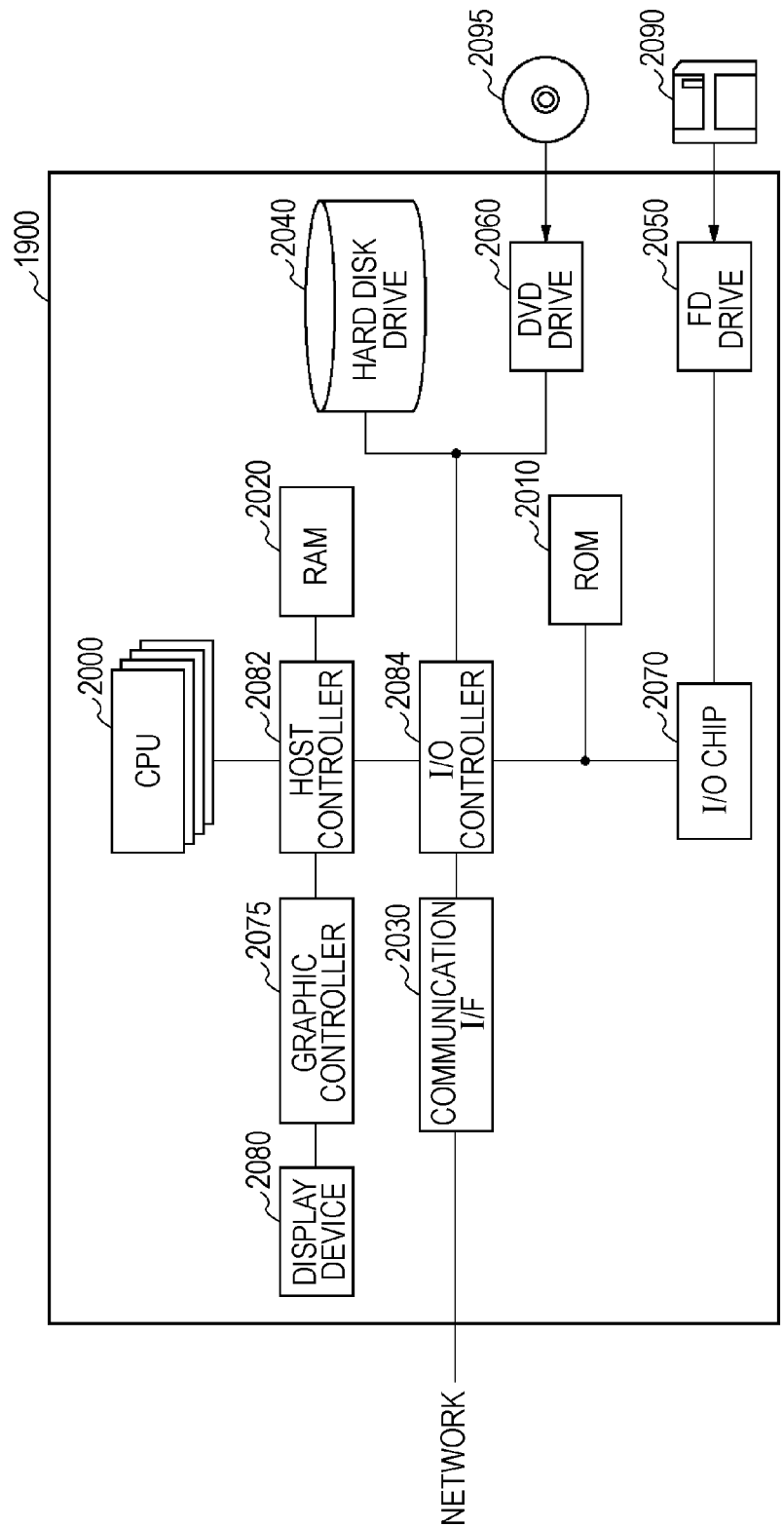
FIG. 16 shows an example of the hardware configuration of a computer in accordance with certain embodiments of the present invention.

FIG. 16 shows an example of the hardware configuration of a computer 1900 in accordance with certain embodiments. As shown, the computer 1900 includes CPU peripherals such as a CPU 2000, a RAM 2020, a graphic controller 2075, and a display device 2080, which are mutually connected by a host controller 2082, an input/output unit including a communication interface 2030, a hard disk drive 2040, and a DVD drive 2060, which is connected to the host controller 2082 by the input/output controller 2084, and a legacy input/output unit including a ROM 2010, a flexible disk drive 2050, and an input/output chip 2070 connected to the input/output controller 2084.

The host controller 2082 may connect the RAM 2020 with the CPU 2000 and the graphic controller 2075, which access the RAM 2020 at a high transfer rate. The CPU 2000 may operate based on programs stored in the ROM 2010 and the RAM 2020, and may control each unit. The graphic controller 2075 may acquire image data generated in a frame buffer in the RAM 2020 by the CPU 2000 and the like, and may then display the data on the display device 2080. In other embodiments, the graphic controller 2075 may include a frame buffer for storing image data generated by the CPU 2000 and the like.

The input/output controller 2084 may connect the host controller 2082 with higher-speed input/output devices or the communication interface 2030, the hard disk drive 2040, and the DVD drive 2060. The communication interface 2030 may communicate with another device through the network. The hard disk drive 2040 may store a program and data used by the CPU 2000 in the computer 1900. The DVD drive 2060 may read a program or data from the DVD 2095, and may send the read data to the hard disk drive 2040 through the RAM 2020.

The input/output controller 2084 may be connected to lower-speed input/output devices or the ROM 2010, the flexible disk drive 2050, and the input/output chip 2070. The ROM 2010 may store a boot program executed upon startup of the computer 1900 and/or a program depending on the hardware of the computer 1900. The flexible disk drive 2050 may read a program or data from the flexible disk 2090 and may send the read data to the hard disk drive 2040 through the RAM 2020. The input/output chip 2070 may connect the flexible disk drive 2050 to the input/output controller 2084 and, in addition, may connect various kinds of input/output devices to the input/output controller 2084 through, for example, a parallel port, a serial port, a keyboard port, a mouse port, and the like.

The program sent through the RAM 2020 toward the hard disk drive 2040 may be stored in the flexible disk 2090, the DVD 2095, an IC card, or other such recording media, and may be provided by a user. The program may be read from the recording medium and installed to the hard disk drive 2040 in the computer 1900 through the RAM 2020, and may be executed on the CPU 2000.

In some embodiments, a program may be installed to the computer 1900 to cause the computer 1900 to function as the resource management device 110. This program may include a front end processing module including a request accepting module, an execution instruction module, a query module, and a resumption instruction module, a query DB management module for managing the query DB 210, a charge DB management module for managing the charge DB 212, an operation DB management module for managing the operation DB 214, an analysis module, a policy DB management module for managing the policy DB 222, a resource DB management module for managing the resource DB 224, a schedule DB management module for managing the schedule DB 226, a resource reservation module, an execution management module, an execution state DB management module for managing an execution state DB 250, an execution history DB management module for managing an execution history DB 260, and a completion estimation module.

The program or modules may cause the CPU 2000 to prompt the computer 1900 to function as the front end processing unit 200, including the request accepting unit 202, the execution instruction unit 204, the query unit 206, and the resumption instruction unit 208, the query DB 210, the charge DB 212, the operation DB 214, the analyzing unit 220, the policy DB 222, the resource DB 224, the schedule DB 226, the resource reservation unit 230, the execution management unit 240, the execution state DB 250, the execution history DB 260, and the completion estimation unit 270.

Information processing described in the above program may be read to the computer 1900 to thereby function as specific units incorporating software and various kinds of hardware resources. Specifically, such units may include the front end processing unit 200 including the request accepting unit 202, the execution instruction unit 204, the query unit 206, and the resumption instruction unit 208, the analyzing unit 220, the resource reservation unit 230, the execution management unit 240, and the completion estimation unit 270. These specific units may realize computing and processing of information according to an application of the computer 1900, thereby constituting the resource management device 110 suitable for the application.

For example, in one embodiment where the computer 1900 communicates with an external device, the CPU 2000 may perform a communication program loaded to the RAM 2020, and may instruct the communication interface 2030 to perform communication processing based on information described in the communication program. The communication interface 2030 may read, under the control of the CPU 2000, transmission data stored in a transmission buffer area on a storage device such as the RAM 2020, the hard disk drive 2040, the flexible disk 2090, or the DVD 2095. The communication interface 2030 may then send the data to the network. Alternatively, the communication interface may write reception data received from the network to a reception buffer area on the storage device. In this way, the communication interface 2030 may transfer transmission/reception data to a state device based on a DMA (direct memory access) method.

In other embodiments, the CPU 2000 may read data from a storage device or the communication interface 2030, and may write the data to the destination communication interface 2030 or storage device, thereby transferring transmission/reception data.

The CPU 2000 may read data from files or databases stored in an external storage device to the RAM 2020 through DMA transfer, for example, to perform various kinds of processing on the data in the RAM 2020. An external storage device may include, for example, the hard disk drive 2040, the DVD drive 2060 (DVD 2095), or the flexible disk drive 2050 (flexible disk 2090).

Then, the CPU 2000 may write back the processed data to the external storage device through DMA transfer or the like. In such processing, the RAM 2020 may temporarily store data in the external storage device. Thus, in certain embodiments, the RAM 2020, the external storage device, and the like may be collectively referred to as "memory, storage unit, or storage devices."

Various kinds of information such as various kinds of programs, data, tables, and databases in accordance with certain embodiments may be stored in such a storage device, and may be subjected to information processing. In some embodiments, the CPU 2000 may move some data in the RAM 2020 to a cache memory, and may read/write data to the cache memory. The cache memory may also perform some functions of the RAM 2020. Thus, in certain embodiments, the cache memory may be included in the RAM 2020, the memory, and/or the storage device.

Further, in certain embodiments, the CPU 2000 may perform various kinds of processing on the data read from the RAM 2020, including various types of computing, information processing, determination of conditions, and retrieval and replacement of information, which may be specified by a sequence of instructions of the program as described herein. Then, the CPU 2000 may write the data back to the RAM 2020. For example, to determine conditions, the CPU 2000 may determine whether the following conditions are satisfied: various variables previously described herein are more, less, not less than, not more than, or equal to another variable or constant. If the conditions are satisfied (or not satisfied), the CPU may branch to a different series of instructions, or may call a sub routine.

Further, in some embodiments, the CPU 2000 may retrieve information stored in files or databases in the storage device. For example, where multiple entries are stored in the storage device, which have first attribute values associated with corresponding second attribute values, the CPU 2000 may search for and select an entry having a first attribute value satisfying a designated condition (from among plural entries stored in the storage device), and may read a second attribute value stored in the entry. This may render it possible to obtain the second attribute value associated with the first attribute value to satisfy a predetermined condition.

In some embodiments, the above program or modules may be stored in an external recording medium. Examples of the recording medium may include, in addition to the flexible disk 2090 and the DVD 2095, an optical recording medium such as a DVD or CD, a magneto-optical recording medium such as an MO, a tape medium, or a semiconductor memory, such as an IC card. In addition, a storage device (such as a hard disk or RAM in a server system) connected to a private communication network or the Internet may be used as a recording medium to load a program to the computer 1900 through the network.

With respect to the execution sequence of processing such as operations, processes, steps, and stages in the device, system, program product, and method described in the scope of claims, the specification, and the accompanying drawings, it should be noted that "ahead of," "prior to," and other such expressions are not particularly used, and these can be performed in any given order unless an output of a previous operation is used in a subsequent operation. As for an operational flow in the scope of claims, the specification, and the accompanying drawings, even if "first," "next," and other such expressions are used as a matter of convenience, these expressions should not be construed as limiting the execution sequence.

The invention claimed is:

1. A device to manage resources for performing operations in a computer system, the device comprising:
   a resource reservation unit to reserve resources for performing an operation specified by a user;
   a query unit to query the user regarding reserving additional resources in the event the operation cannot be completed within a reserved time using the reserved resources;
   a resumption instruction unit to cause the resource reservation unit to reserve the additional resources and continue the operation at an agreed-upon resumption fee upon receiving a resumption instruction from the user in response to the query; and
   the resumption instruction unit further configured to, prior to receiving the resumption instruction from the user, cause the resource reservation unit to reserve free resources and resume the operation, wherein the resumption instruction unit charges a modified resumption fee in the event the operation is resumed prior to receiving the resumption instruction.

2. The device of claim 1, wherein the query unit further queries the user regarding payment of a resumption fee needed to reserve the additional resources and continue the operation, and wherein the resumption instruction unit reserves the additional resources and continues the operation upon receiving an instruction to pay the resumption fee in response to the query.

3. The device of claim 2, further comprising:
   an execution management unit to cause execution of the operation for a reserved time in the reserved resources; and
   an execution state storage unit to store an execution state corresponding to the operation in the event a completion estimation unit estimates that the operation is unlikely to be completed within the reserved time, wherein the resumption instruction unit further recalls the execution state to reserve the additional resources and cause continuation of the operation.

4. The device of claim 3, wherein the execution management unit recalls the execution state in the event the additional resources are different from the reserved resources.

5. The device of claim 3, further comprising a request accepting unit to receive from the user an execution service level request for reserved resources corresponding to an identified execution service level, wherein the resource reservation unit ensures that at least one of the reserved resources and the additional resources satisfy the execution service level request.

6. The device of claim 5, wherein the query unit further queries the user regarding changing the identified execution service level to a resumption service level for the additional resources, and wherein the resource reservation unit reserves additional resources satisfying the resumption service level in response to a change instruction from the user.

7. The device of claim 1, wherein the resumption instruction unit charges a reduced resumption fee in the event the operation is resumed prior to receiving the resumption instruction.

8. The device of claim 1, wherein the resumption instruction unit selects the operation from a plurality of suspended operations and resumes the operation based on at least one of a priority assigned to the user, an amount of the resumption fee, and an estimated time necessary to perform the operation.

9. The device of claim 3, wherein the execution management unit suspends the operation within a suspension time necessary to save the execution state prior to an ending time associated with the reserved resources in the event the completion estimation unit estimates that the operation is unlikely to be completed within the reserved time.

10. The device of claim 9, further comprising an execution history storage unit to store an operation duration history comprising operation duration times corresponding to past operations, wherein the completion estimation unit estimates whether the operation is likely to be completed within a reserved time based on the operation duration history.

11. A computer program product to manage resources for performing operations in a computer system, the computer program product comprising:
   a non-transitory computer-readable medium having computer usable program code stored therein, the computer-usable program code comprising:

computer-usable program code to reserve resources for performing an operation specified by a user;

computer-usable program code to query the user regarding whether to reserve additional resources in the event the operation cannot be completed within a reserved time using the reserved resources;

computer-usable program code to reserve the additional resources and cause a continuation of the operation at an agreed-upon resumption fee upon receiving a resumption instruction from the user to reserve the additional resources; and computer-usable program code to, prior to receiving the resumption instruction from the user, reserve free resources and resume the operation at a modified resumption fee.

12. The computer program product of claim 11, further comprising:

computer-usable program code to query the user regarding payment of a resumption fee needed to reserve the additional resources and continue the operation; and computer-usable program code to reserve the additional resources and continue the operation upon receiving an instruction to pay the resumption fee in response to the query.

13. The computer program product of claim 11, further comprising:

computer-usable program code to cause execution of the operation for a reserved time in the reserved resources;

computer-usable program code to store an execution state of the operation in the event the operation cannot be completed within the reserved time in the reserved resources; and computer-usable program code to recall the execution state to reserve the additional resources and cause continuation of the operation in the additional resources.

14. The computer program product of claim 11, further comprising:

computer-usable program code to receive from the user an execution service level request for reserved resources to correspond to an identified execution service level; and computer-usable program code to satisfy the execution service level request.

15. The computer program product of claim 13, further comprising:

computer-usable program code to estimate whether the operation is likely to be completed within the reserved time associated with the reserved resources; and computer-usable program code to suspend the operation within a suspension time necessary to save the execution state prior to an ending time associated with the reserved resources in the event the estimation indicates that the operation is unlikely to be completed within the reserved time.

16. A method for managing resources performing operations in a computer system, the method comprising:

reserving resources for performing an operation specified by a user;

querying the user to determine whether to reserve additional resources in the event the operation cannot be completed within a reserved time using the reserved resources;

upon receiving a resumption instruction from the user, reserving the additional resources and causing a continuation of the operation at an agreed-upon resumption fee; and prior to receiving the resumption instruction from the user, reserving free resources and resuming the operation at a modified resumption fee.

17. The method of claim 16, wherein reserving the additional resources further comprises:

querying the user regarding payment of a resumption fee needed to reserve the additional resources and continue the operation; and reserving the additional resources and continuing the operation upon receiving an instruction to pay the resumption fee in response to the query.

* * * * *